United States Patent
Kogan et al.

(10) Patent No.: US 9,179,490 B2
(45) Date of Patent: Nov. 3, 2015

(54) APPARATUS, SYSTEM AND METHOD OF DISCONNECTING A WIRELESS COMMUNICATION LINK

(71) Applicant: Intel Corporation, Santa Clara, CA (US)

(72) Inventors: Noam Kogan, Ra'anana (IL); Assaf Kasher, Haifa (IL); Avi Tel-Or, Aseret (IL); Tom Harel, Shfaim (IL)

(73) Assignee: INTEL CORPORATION, Santa Clara, CA (US)

( * ) Notice: Subject to any disclaimer, the term of this patent is extended or adjusted under 35 U.S.C. 154(b) by 247 days.

(21) Appl. No.: 13/688,425

(22) Filed: Nov. 29, 2012

(65) Prior Publication Data

US 2014/0148193 A1    May 29, 2014

(51) Int. Cl.
*H04W 24/00* (2009.01)
*H04W 76/06* (2009.01)

(52) U.S. Cl.
CPC ............... *H04W 76/06* (2013.01); *Y02B 60/50* (2013.01)

(58) Field of Classification Search
CPC .................................................. H04W 76/06
USPC ........ 455/508, 418, 432.1, 404.1, 406, 456.1, 455/553.1, 67.11, 452.1, 456.3, 227, 550.1, 455/405, 439, 422.1
See application file for complete search history.

(56) References Cited

U.S. PATENT DOCUMENTS

| | | | |
|---|---|---|---|
| 5,300,935 A | 4/1994 | Yu | |
| 5,649,306 A | 7/1997 | Vannatta et al. | |
| 6,281,839 B1 | 8/2001 | Nielsen | |
| 6,311,075 B1 * | 10/2001 | Bevan et al. | 455/562.1 |
| 8,230,075 B1 * | 7/2012 | Weskamp et al. | 709/227 |
| 2002/0106995 A1 | 8/2002 | Callaway, Jr. | |
| 2003/0232598 A1 | 12/2003 | Aljadeff et al. | |
| 2005/0192056 A1 | 9/2005 | Karaki | |
| 2006/0007041 A1 | 1/2006 | Oomuro | |
| 2006/0240866 A1 | 10/2006 | Eilts | |
| 2006/0287085 A1 * | 12/2006 | Mao et al. | 463/37 |
| 2007/0263578 A1 | 11/2007 | Nakaso et al. | |
| 2008/0024363 A1 | 1/2008 | Van Toorenburg | |
| 2009/0156235 A1 | 6/2009 | Johansson et al. | |

(Continued)

FOREIGN PATENT DOCUMENTS

| | | |
|---|---|---|
| EP | 1360857 | 11/2003 |
| JP | 2004356739 | 12/2004 |

(Continued)

OTHER PUBLICATIONS

International Preliminary Report on Patentability for PCT Application No. PCT/US2011/048658, mailed on Mar. 6, 2014, 6 pages.
International Search Report and Written Opinion for PCT Patent Application No. PCT/US2013/047733, mailed on Sep. 30, 2013, 12 pages.

(Continued)

*Primary Examiner* — Joseph Arevalo
(74) *Attorney, Agent, or Firm* — Shichrur & Co.

(57) ABSTRACT

Some demonstrative embodiments include apparatuses, systems and method of disconnecting a wireless communication link. For example, a wireless communication device may include a controller to receive placement-related information indicating a change in one or more placement-related attributes of the wireless communication device, during communication over a wireless communication link, and based on the orientation-related information to disconnect the wireless communication link.

30 Claims, 5 Drawing Sheets

(56) References Cited

U.S. PATENT DOCUMENTS

| | | | |
|---|---|---|---|
| 2009/0295648 A1 | 12/2009 | Dorsey et al. | |
| 2009/0303204 A1* | 12/2009 | Nasiri et al. | 345/184 |
| 2010/0333043 A1* | 12/2010 | Faris et al. | 715/863 |
| 2012/0058783 A1* | 3/2012 | Kim et al. | 455/456.2 |
| 2012/0071151 A1* | 3/2012 | Abramson et al. | 455/418 |
| 2012/0105720 A1* | 5/2012 | Chung et al. | 348/468 |
| 2012/0122400 A1 | 5/2012 | Kitagawa et al. | |
| 2012/0256959 A1* | 10/2012 | Ye et al. | 345/649 |
| 2012/0265528 A1* | 10/2012 | Gruber et al. | 704/235 |
| 2013/0065648 A1* | 3/2013 | Kim et al. | 455/566 |
| 2013/0069969 A1* | 3/2013 | Chang et al. | 345/589 |
| 2013/0084981 A1* | 4/2013 | Zalewski et al. | 463/36 |
| 2013/0151195 A1* | 6/2013 | Marinoni | 702/151 |
| 2013/0238455 A1* | 9/2013 | Laracey | 705/21 |
| 2014/0118254 A1* | 5/2014 | Fei et al. | 345/157 |
| 2014/0125575 A1* | 5/2014 | Samanta Singhar | 345/156 |
| 2014/0140426 A1 | 5/2014 | Dinur et al. | |
| 2014/0159957 A1 | 6/2014 | Kasher et al. | |

FOREIGN PATENT DOCUMENTS

| | | |
|---|---|---|
| JP | 2006295622 | 10/2006 |
| JP | 2007274518 | 10/2007 |
| KR | 2003-0058098 A | 7/2003 |
| KR | 10-2009-0074814 A | 7/2009 |
| WO | 2013028171 A1 | 2/2013 |

OTHER PUBLICATIONS

International Search Report and Written Opinion for PCT Patent Application No. PCT/US2013/048087, mailed on Sep. 26, 2013, 13 pages.
Wireless-Gigabit-Alliance (WGA) specifications (Wireless Gigabit Alliance, Inc WiGig MAC and PHY Specification Version 1.0, Final specification), Apr. 2010.
IEEE Std 802.11™-2012. Part 11: Wireless Lan Medium Access Control (MAC) and Physical Layer (PHY) Specifications, IEEE Standard for Information technology. Telecommunications and information exchange between systems Local and metropolitan area networks-Specific requirements, IEEE Computer Society, Mar. 29, 2012.
International Search Report and Written Opinion for PCT application PCT/US2011/048658 mailed on Feb. 21, 2012.
Supplementary Partial European Search Report for European Patent Application No. 11871311.4, mailed on Apr. 8, 2015, 6 pages.
International Preliminary Report on Patentability and Written Opinion for International Patent Application No. PCT/US2013/047733, mailed on Jun. 11, 2015, 8 pages.
Office Action for U.S. Appl. No. 13/976,057, mailed on Apr. 23, 2015, 29 pages.
Extended European Search Report for European Patent Application No. 11871311.4, mailed on Jul. 27, 2015, 10 pages.
Office Action from U.S. Appl. No. 13/707,106, Mailed on Sep. 9, 2015, 50 pages.

* cited by examiner

APPARATUS, SYSTEM AND METHOD OF DISCONNECTING A WIRELESS COMMUNICATION LINK

BACKGROUND

Mobile platforms are becoming smaller and smaller, and typically have smaller screens and less Input/Output (IO) ports from generation to generation.

Docking stations are commonly used nowadays to extend the IO port array of the mobile platforms, and provide a convenient means for a mobile platform to hook up to a static variety of peripheral devices ("peripherals"), such as displays, monitors, external storage devices, external Hard Disk Drives (HDD), a mouse, a keyboard, a webcam, communication devices, and the like.

A docking device (also referred to as "docking station") may typically be placed on a table, while being permanently connected to the peripherals, and the user may connect the mobile platform to the docking station ("dock") to utilize the peripherals.

A wireless docking station may be configured to enable a wireless connection of the mobile platform to the wireless docking station. The wireless connection may enable the user to connect the mobile device to the peripheral devices without physically connecting the mobile device to the docking station.

Accordingly, the wireless docking station may provide a convenient and easy to use connection between the mobile platform and the peripheral devices.

However, since the mobile platform is not physically connected to the docking station, movement of the mobile platform can cause unpredictable effects on the wireless communication link between the mobile platform and the docking station.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
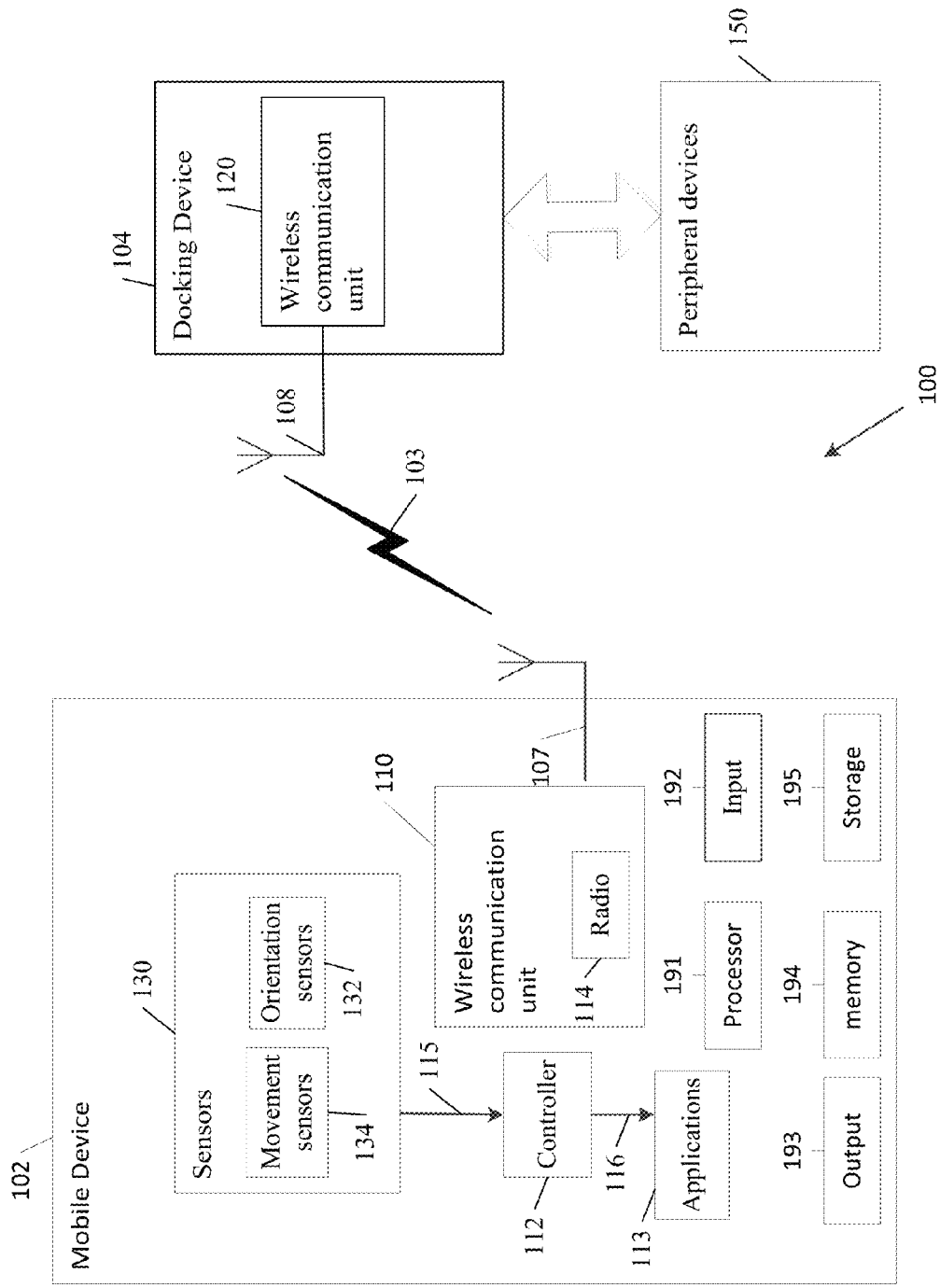
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11 task group ac (TGac) ("IEEE802.11-09/0308r12—TGac Channel Model Addendum Document"); IEEE 802.11 task group ad (TGad) (IEEE P802.11ad Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band)) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 40 GHz.

The term "beamforming", as used herein, may relate to a spatial filtering mechanism, which may be used at a transmitter and/or a receiver to improve the received signal power or signal-to-noise ratio (SNR) at an intended receiver.

The phrase "docking station", as used herein, may relate to an interface connected to one or more peripheral devices, e.g., a display, one or more speakers, a mouse, a keyboard and/or the like, configured to enable a device to connect to and communicate with the peripheral devices. For example, the docking station may be configured to enable a mobile device, e.g., a mobile computer, to connect to an external display and/or an external keyboard.

In some demonstrative embodiments, a mobile device may establish a wireless communication link with a wireless docking station to connect the mobile device to one or more peripheral devices, e.g., when the mobile device is located at close proximity to the wireless docking station.

In some demonstrative embodiments, the mobile device may disconnect the wireless communication link between the mobile device and the wireless docking station, e.g., based on a movement of the mobile device.

Reference is now made to FIG. 1, which schematically illustrates a block diagram of a system 100, in accordance with some demonstrative embodiments.

In some demonstrative embodiments, system 100 may include a wireless communication network including one or more wireless communication devices, e.g., wireless communication devices 102 and/or 104, capable of communicating content, data, information and/or signals over a wireless communication link 103, for example, over a radio channel, an IR channel, a RF channel, a Wireless Fidelity (WiFi) channel, and the like. One or more elements of system 100 may optionally be capable of communicating over any suitable wired communication links.

In some demonstrative embodiments, devices 102 and/or 104 may include a wireless communication unit capable of communicating content, data, information and/or signals over wireless communication link 103. For example, device 102 may include a wireless communication unit 110 and device 104 may include a wireless communication unit 120.

In some demonstrative embodiments, wireless communication units 110 and/or 120 may include, or may be associated with, one or more antennas 107 and 108, respectively. Antennas 107 and/or 108 may include any type of antennas suitable for transmitting and/or receiving wireless communication signals, blocks, frames, transmission streams, packets, messages and/or data. For example, antennas 107 and/or 108 may include any suitable configuration, structure and/or arrangement of one or more antenna elements, components, units, assemblies and/or arrays. Antennas 107 and/or 108 may include, for example, antennas suitable for directional communication, e.g., using beamforming techniques. For example, antennas 107 and/or 108 may include a phased array antenna, a single element antenna, a set of switched beam antennas, and/or the like. In some embodiments, antennas 107 and/or 108 may implement transmit and receive functionalities using separate transmit and receive antenna elements. In some embodiments, antennas 107 and/or 108 may implement transmit and receive functionalities using common and/or integrated transmit/receive elements.

In some demonstrative embodiments, wireless communication units 110 and/or 120 may include, for example, one or more radios, e.g., a radio 114, including one or more wireless transmitters, receivers and/or transceivers able to send and/or receive wireless communication signals, RF signals, frames, blocks, transmission streams, packets, messages, data items, and/or data.

In some demonstrative embodiments, wireless communication devices 102 and/or 104 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

Devices 102 and/or 104 may also include, for example, one or more of a processor 191, an input unit 192, an output unit 193, a memory unit 194, and a storage unit 195. Device 102 may optionally include other suitable hardware components and/or software components. In some demonstrative embodiments, some or all of the components of one or more of devices 102 and 104 may be enclosed in a common housing or packaging, and may be interconnected or operably associated using one or more wired or wireless links. In other embodiments, components of device 102 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, device 102 may include, or may be included as part of a mobile or portable device, for example, a mobile computer, a laptop computer, a notebook computer, a tablet computer, a Smartphone, a handheld computer, a handheld device, a PDA device, a handheld PDA device, an on-board device, an off-board device, a hybrid device, a consumer device, a vehicular device, a non-vehicular device, a cellular telephone, a PCS device, a PDA device which incorporates a wireless communication device, a mobile or portable GPS device, a relatively small computing device, a non-desktop computer, a CSLL device, an UMD, an UMPC, an MID, an "Origami" device or computing device, a device that supports DCC, a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a music player, or the like.

In some demonstrative embodiments, device 104 may perform the functionality of a docking device configured to connect between device 102 and one or more peripheral devices 150 ("peripherals").

In some demonstrative embodiments, peripheral devices 150 may include a keyboard, a mouse, a display, speakers, a USB hub, an external storage, and/or the like.

In some demonstrative embodiments, device 104 may be implemented as a dedicated docking device, e.g., separate from peripheral devices 150. In other embodiments, device 104 may be implemented as part of a peripheral device of peripheral devices 150, e.g., as an integrated chip (IC) installed in the peripheral device, for example, an IC housed within a display, a projector, a Smart TV and/or the like.

In some demonstrative embodiments, device 104 may be connected to peripheral devices 150, for example, utilizing one or more connectors, e.g., a USB connector, an HD multimedia interface (HDMI) connector, and/or the like.

In some demonstrative embodiments, device 104 may be configured to transfer data between mobile device 102 and peripheral devices 150.

In some demonstrative embodiments, device 104 may enable a user of mobile device 102 to utilize peripherals 150. For example, the user may utilize device 104 to work with mobile device 102 utilizing, for example, an external keyboard, an external mouse, speakers, an external display and/or the like.

In some demonstrative embodiments, mobile device 102 may communicate with peripheral devices 125 via wireless communication link 103 between device 102 and device 104.

In some demonstrative embodiments, wireless communication link 103 may include a wireless communication link over the DMG band.

In some demonstrative embodiments, wireless communication link 103 may include a wireless gigabit (WiGig) link. For example, wireless communication link 103 may include a beamformed link, e.g., utilizing any suitable beamforming technique. In other embodiments, wireless communication link 103 may include any other suitable link and/or may utilize any other suitable wireless communication technology.

In some demonstrative embodiments, wireless communication link 103 may include a direct link, e.g., a P2P link, for example, to enable direct communication between devices 102 and 104.

In some demonstrative embodiments, wireless communication units 110 and/or 120 may establish wireless communication link 103 to enable a user of mobile device 102 to utilize peripheral devices 150, for example, when device 102 is located at close proximity to device 104.

For example, device 104 may be placed on a table while being permanently connected to peripheral devices 150, e.g., an external display, mouse and/or keyboard. Wireless communication units 110 and 120 may establish wireless communication link 103, and may connect between mobile device 102 to peripheral devices 150, if the user approaches device 104, e.g., at a relatively close distance, for utilizing peripheral devices 150.

In some demonstrative embodiments, device 102 may disconnect wireless communication link 103 between wireless communication units 110 and 120, for example, upon detecting a movement of device 102, e.g., when a user of mobile device 102 moves mobile device 102 away from docking station 104 and/or upon the user of device 102 performs a predefined movement and/or rotation of device 102, e.g., as described below.

In some demonstrative embodiments, device 102 may include a controller 112 configured to disconnect wireless communication link 103, e.g., based on the detected movement of device 102, e.g., as described below.

In some demonstrative embodiments, controller 112 may be implemented as part of wireless communication unit 110. In other embodiments, controller 112 may be implemented as a separate element or as part of another element of device 102.

In some demonstrative embodiments, controller 112 may disconnect wireless communication link 103, for example, by powering down one or more elements of radio 114 and/or any other radio frequency (RF) elements of device 102, by informing one or more applications 113 running on device 102, e.g., via one or messages 116, that wireless communication link 103 is not available and/or disconnected.

In some demonstrative embodiments, controller 112 may be configured to disconnect wireless communication link 103 based on placement-related information 115 indicating a change in one or more placement-related attributes of device 102.

The phrase "placement-related attribute" as used herein with reference to a device may include any suitable attribute and/or parameter defining and/or representing a physical manipulation, movement, rotation, orientation and/or displacement of the device. For example, the placement-related attribute of device 102 may include any suitable attribute and/or parameter defining and/or representing an orientation, a movement, a rotation, a displacement and/or a physical manipulation of device 102.

In some demonstrative embodiments, controller 112 may be configured to receive placement-related information 115 from one or more sensors 130, during communication over wireless communication link 103, and based on placement-related information 115 to disconnect wireless communication link 103, e.g., as described below.

In some demonstrative embodiments, sensors 130 may include at least one sensor capable of sensing the placement-related attribute of device 102. Sensors 130 may include any suitable device, unit, module and/or element capable of sensing, detecting, tracking and/or determining at least one placement-related attribute and/or a change of the at least one placement-related attribute of device 102.

In some demonstrative embodiments, placement-related information 115 may include orientation-related information representing one or more orientation-related attributes of device 102. For example, the orientation-related attributes may include a yaw parameter relating to a yaw of device 102, a pitch parameter relating to a pitch of device 102 and/or a roll parameter relating to a roll of device 102.

In some demonstrative embodiments, sensors 130 may include one or more orientation sensors 132, e.g., a gyroscope, a compass, a digital compass, a camera and the like, to provide orientation-related information 115.

In some demonstrative embodiments, placement-related information 115 may include position-related information representing one or more position-related attributes of device 102. For example, the position-related attributes may include acceleration parameters relating to an acceleration of device 102, velocity parameters relating to a velocity of device 102 and/or a distance parameter relating to a distance of a movement of device 102.

In some demonstrative embodiments, sensors 130 may include one or more movement sensors 134, e.g., an accelerometer, a movement detector, a camera, a tracking module, a tracing module and the like, to provide position-related information 115.

In some demonstrative embodiments, sensors 130 may include, or may be included as part of, a hardware module of device 102, e.g., an accelerometer and the like, a software module of device 102, e.g., movement detection software, and/or any combination of hardware and software, e.g., a camera and movement detection software.

In some demonstrative embodiments, sensors 130 may provide placement-related information 115 to controller 112 including the position-related information and/or the orientation-related information in any suitable format.

In some demonstrative embodiments, placement-related information 115 may represent a placement-related attribute of device 102 with respect to a reference point.

In some demonstrative embodiments, placement-related information 115 may represent the placement of device 102 in one or more dimensions, with respect to the reference point, for example, in one dimension (1D), e.g., along a linear line, in two dimensions (2D), e.g., in a plane, and/or in three dimensions (3D), e.g., in a space, for example, as described below with reference to FIG. 2.

Figure 2:
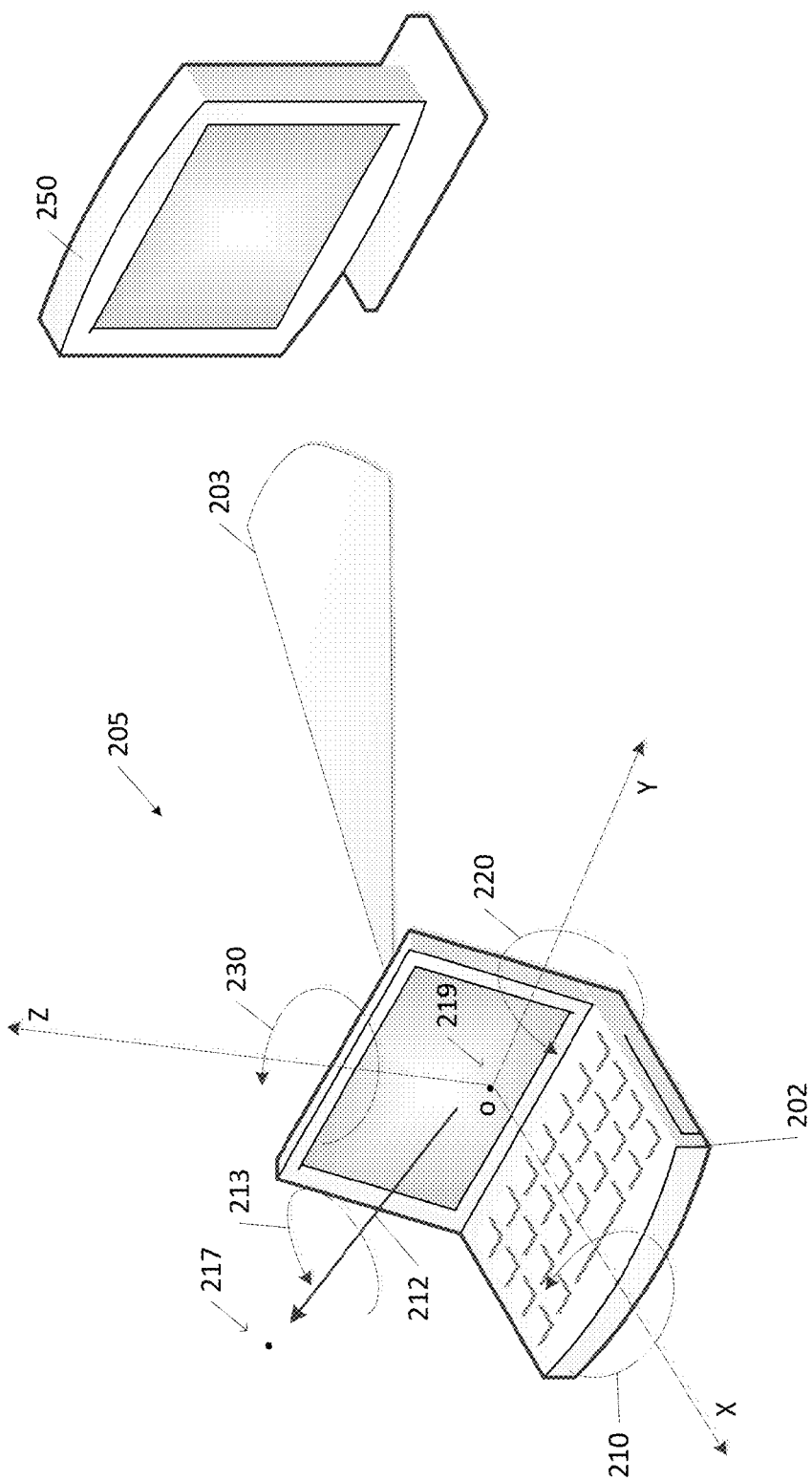
FIG. 2 is a conceptual illustration of a mobile device wirelessly communicating with a wireless docking display, in accordance with some demonstrative embodiments.

Reference is made to FIG. 2, which conceptually illustrates a mobile device 202 communicating with a wireless docking display 250 over a wireless communication link 203, in accordance to some demonstrative embodiments. For example, mobile device 202 may perform the functionality of device 102 (FIG. 1), wireless docking display 250 may perform the functionality of device 104 (FIG. 1) and/or peripheral devices 150 (FIG. 1), and/or wireless communication link 203 may perform the functionality of wireless communication link 103 (FIG. 1), Although the conceptual illustration of FIG. 2 depicts a notebook communicating with a wireless docking display via a docking station housed within the wireless docking display, in other embodiments any other mobile device may communicate with any other device. For example, a Smartphone, a laptop, a notebook and or the like, may communicate with a TV, a projector, speakers, and/or the like, via an external or an internal wireless docking device.

As shown in FIG. 2, device 202 may be placed in a 3D space with respect to wireless docking display 250.

As shown in FIG. 2, the 3D space may be represented by a Cartesian coordinate system 205. For example, Cartesian coordinate system 205 may include three axes, e.g., a first axis, denoted X, a second axis, denoted Y, perpendicular to the first axis X, and a third axis, denoted Z, perpendicular to axes X and Y. In other embodiments, the 3D space may be represented by any other coordinate system, e.g., a spherical coordinate system, a cylindrical coordinate system, and the like.

In some demonstrative embodiments, a placement of device 202 may be represented based on Cartesian coordinate system 205. For example, the placement of device 202 may be represented by a placement of device 202 with respect to the X-axis, the Y-axis and the Z-axis.

In some demonstrative embodiments, the placement of device 202 may include a position of device 202 with respect to coordinate system 250, and/or an orientation of device 202 with respect to coordinate system 250.

In some demonstrative embodiments, a change in a placement of device 202 may include a position change in a position of device 202, for example, a movement device 202 in one or more directions; and/or an orientation change of an orientation of device 202, for example, a rotation of device 202 with respect to one or more axes.

As shown in FIG. 2, device 202 may be placed at a first point 219, e.g., an origin, denoted o, of coordinate system 205.

In some demonstrative embodiments, device 202 may be moved from first point 219 to a second point 217, e.g., in one or more directions, for example, a direction parallel to the X-axis, a direction parallel to the Y-axis, and/or a direction parallel to the Z-axis.

For example, device 202 may be moved from first point 219 to second point 217 in a direction 212, including a combination of a movement parallel to the Z-axis, a movement parallel to the X-axis and/or a movement parallel to the Y-axis.

In some demonstrative embodiments, device 202 may be rotated, e.g., clockwise or counterclockwise, in one or more directions.

In some demonstrative embodiments, device 202 may be rotated in one or more directions with respect to one or more of axes X, Y and/or Z. For example, a change of a roll of device 202 may be demonstrated as a roll rotation 210 along the X axis, a change of a pitch of device 202 may be demonstrated as a pitch rotation 220 along the Y axis, and a change of a yaw of device 202 may be demonstrated as a yaw rotation 230 along the Z axis.

For example, device 202 may be rotated by a rotation 213, which may include a combination of yaw rotation 230, roll rotation 210 and pitch rotation 220.

In some demonstrative embodiments, device 202 may be rotated in one or more directions with respect to one or more of axes X, Y and/or Z together with a movement of device 202 in one or more directions. For example, device 202 may be rotated by rotation 213 and moved from first point 219 to second point 217.

Referring back to FIG. 1, in some demonstrative embodiments, controller 112 may receive from sensors 130 placement-related information 115 including first placement-related information indicating a first placement-related attribute of device 102 at a first time and second placement-related information indicating a second placement-related attribute of device 102 at a second time, e.g., subsequent to the first time. For example, controller 112 may receive placement-related information 115 from sensors 130 according to a predefined timing scheme, e.g., every second, or the like. In another example, sensors 130 may be capable of providing placement-related information 115 to controller 112 based on any suitable criterion, for example, when a change in a sensed placement-related attribute is detected, when the change in the sensed placement-related attribute is equal to or greater than a predefined threshold, and the like. In another example, placement-related information 115 may include relative placement-related information indicating a relative placement-related attribute of device 102, e.g., with respect to a start point, a reference point or value, and the like.

In some demonstrative embodiments, controller 112 may detect a placement change in one or more placement-related attributes included in placement-related information 115. For example, controller 112 may detect a change in a placement-related attribute, e.g., if a first value of the placement-related attribute at the first time is greater or lesser than a second value of the placement-related attribute at the second time. In other embodiments, placement-related information 115 may include the placement change.

In some demonstrative embodiments, controller 112 may compare the placement change in the placement-related attribute to a placement-related threshold of the placement-related attribute.

In some demonstrative embodiments, controller 112 may determine whether or not to disconnect wireless communication link 103 based on one or more comparisons between one or more placement changes in the placements-related attributes and one or more placement-related thresholds of the placements-related attributes.

In some demonstrative embodiments, a placement change of device 102 may include an orientation change in an orientation of device 102, e.g., a change in one or more orientation-related attributes of device 102, and/or a position change in a position of device 102, e.g., a change in one or more position-related attributes of device 102.

In some demonstrative embodiments, controller 112 may disconnect wireless communication link 103 based on one or more orientation-related comparisons between one or more orientation changes in the orientation-related attributes and one or more orientation-related thresholds of the orientation-related attributes, one or more position-related comparisons between one or more position changes in position-related attributes and corresponding position-related thresholds of the position-related attributes, and/or any other combination of position-related comparisons and orientation-related comparisons, e.g., as described below.

In some demonstrative embodiments, controller 112 may receive from sensors 132 placement-related information 115 including orientation-related information representing one or more orientation-related attributes of device 102, e.g., a yaw of device 102, a pitch of device 102, and/or a roll of device 102.

In some demonstrative embodiments, controller 112 may determine a change in an orientation-related attribute of device 102 during a predefined time period, denoted TI1, for example, one second, e.g., as described below.

In some demonstrative embodiments, controller 112 may determine a change of the pitch of device 102, denoted Δpitch, during the predefined time period TI1, for example, resulting from pitch rotation 220 (FIG. 2), e.g., as follows:

$$\Delta\text{pitch} = \text{new pitch} - \text{old pitch} \qquad (1)$$

wherein old pitch denotes the pitch of device 102 at the beginning of the predefined time period TI1 and new pitch denotes the pitch of device 102 at the end of the predefined period TI1.

In some demonstrative embodiments, controller 112 may determine a change of the roll of device 102, denoted Δroll, during the predefined time period TI1, for example, resulting from roll rotation 210 (FIG. 2), e.g., as follows:

$$\Delta\text{roll} = \text{new roll} - \text{old roll} \qquad (2)$$

wherein old roll denotes the roll of device 102 at the beginning of the predefined time period TI1, and new roll denotes the roll of device 102 at the end of the predefined period TI1.

In some demonstrative embodiments, controller 112 may determine a change of the yaw of device 102, denoted Δyaw, during the predefined time period TI1, for example, resulting from yaw rotation 230 (FIG. 2), e.g., as follows:

$$\Delta\text{yaw} = \text{new yaw} - \text{old yaw} \qquad (3)$$

wherein old yaw denotes the yaw of device 102 at the beginning of the predefined time period TI1, and new yaw denotes the yaw of device 102 at the end of the predefined period TI1.

In some demonstrative embodiments, one or more predefined orientation-related thresholds may be determined for the one or more orientation-related attributes. For example, the orientation-related thresholds may include a predefined yaw threshold, denoted TH_Y, a predefined roll threshold, denoted TH_R, and/or a predefined pitch threshold, denoted TH_P. In one example, the predefined roll threshold TH_R may include a rotation of roll rotation 210 (FIG. 2), which is greater than a predefined threshold angle, e.g., 70 degrees.

In some demonstrative embodiments, different predefined orientation-related thresholds, e.g., different yaw, pitch and/or roll thresholds, may be defined for different mobile devices. For example, a first pitch threshold for a notebook may be different from, e.g., greater than, a second pitch threshold for a Smartphone, for example, due to the different volumes of the Smartphone and the notebook, and/or due to different ways of handling the Smartphone and the notebook.

In some demonstrative embodiments, controller 112 may select to disconnect wireless communication link 103 based on at least one comparison between one or more changes in the orientation-related attributes of device 102 and the predefined orientation-related thresholds.

For example, controller 112 may select to disconnect wireless communication link 103 based on a first comparison between the change of the pitch Δpitch, e.g., resulting from pitch rotation 220 (FIG. 2), during the predefined time period TI1, and the predefined pitch threshold TH_P; a second comparison between the change of the yaw Δyaw, e.g., resulting from yaw rotation 230 (FIG. 2), during the predefined time period TI1, and the predefined yaw threshold TH_Y; and/or a third comparison between the change of the roll Δroll, e.g., resulting from roll rotation 210 (FIG. 2), during the predefined time period TI1, and the predefined roll threshold TH_R.

In some demonstrative embodiments, controller 112 may determine the orientation change of device 102 based on the first second and/or third comparisons, e.g., if at least one of the orientation changes is greater than the predefined orientation-related thresholds.

In some demonstrative embodiments, controller 112 may determine that device has undergone a big orientation change, for example, if two or more of the orientation changes are greater than the predefined orientation-related thresholds.

In some demonstrative embodiments, controller 112 may disconnect wireless communication link 103 if controller 112 determines that device 102 has undergone a big orientation change.

For example, controller 112 may determine that device 102 has undergone a big orientation change, e.g., if the change of the pitch Δpitch is greater than the pitch threshold TH_P and the change of the yaw Δyaw is greater than the yaw threshold TH_Y; the change of the roll Δroll is greater than the roll threshold TH_R and the change of the yaw Δyaw is greater than the yaw threshold TH_Y; and/or the change of the roll Δroll is greater than the roll threshold TH_R and the change of the pitch Δpitch is greater than the pitch threshold TH_P, e.g., as follows:

$$\text{big orientation change} = (\Delta\text{pitch} > TH\_P \wedge \Delta\text{yaw} > TH\_Y) \vee$$

$$(\Delta\text{roll} > TH\_R \wedge \Delta\text{yaw} > TH\_Y) \vee$$

$$(\Delta\text{roll} > TH\_R \wedge \Delta\text{pitch} > TH\_P) \qquad (4)$$

The big orientation change of Equation 4 may indicate that a user of device 102 rotates device 102 at a relatively large angle including at least two rotations, e.g., a large roll rotation 210 (FIG. 2) combined with a large pitch rotation 220 (FIG. 2). Accordingly, the big orientation change may indicate that the user of device 102 is moving device 102 away from device 104.

Figure 3:
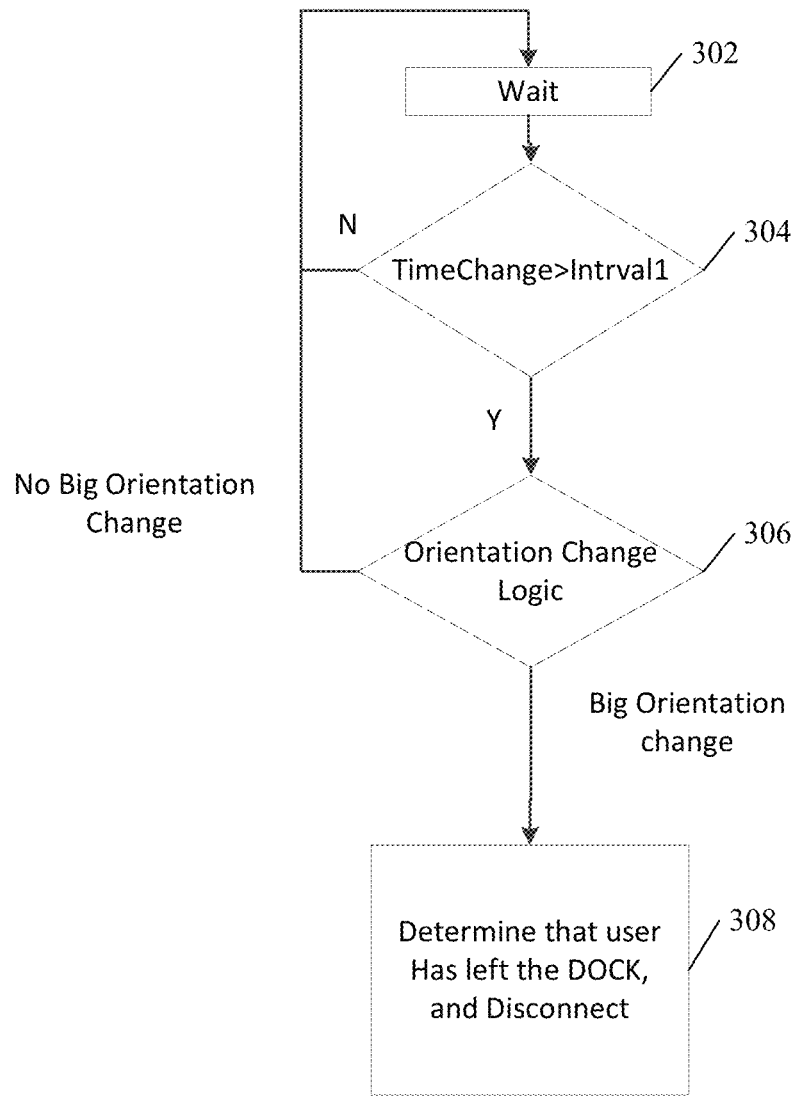
FIG. 3 is a schematic flow-chart illustration of a method of determining whether or not to disconnect a wireless communication link between a mobile device and a wireless docking station, in accordance with some demonstrative embodiments.

Reference is made to FIG. 3, which schematically illustrates a method of determining whether or not to disconnect a wireless communication link between a mobile device and a wireless communication device, e.g., a wireless docking station, in accordance with some demonstrative embodiments.

In some embodiments, one or more of the operations of the method of FIG. 3 may be performed by a wireless communication system, e.g., system 100 (FIG. 1); a mobile device, e.g., devices 102 (FIG. 1) and/or device 104 (FIG. 1); a wireless communication unit, e.g., wireless communication units 110 and/or 120 (FIG. 1); and/or a controller, e.g., controller 112 (FIG. 1).

As indicated at block 302, the method may include waiting for a predefined time period for placement-related information during communication over a wireless communication link. For example, controller 112 (FIG. 1) may wait for the predefined time period TH1 for placement-related information 115 (FIG. 1) during communication with device 104 (FIG. 1) over wireless communication link 103 (FIG. 1), e.g., as described above.

As indicated at block 304, the method may include determining whether or not the predefined time period has passed. For example, controller 112 (FIG. 1) may determine if predefined time period TH1 ended, e.g., as described above.

In some demonstrative embodiments, the method may include waiting during the predefined period, e.g., as described above with reference to block 302, for example, if the predefined time period did not end.

As indicated at block 306, the method may include determining whether or not the mobile device has undergone a big orientation change. For example, controller 112 (FIG. 1) may determine whether or not an orientation change of device 102 is a big orientation change, e.g., as described above.

In some demonstrative embodiments, the method may include waiting during the predefined period, e.g., as described above with reference to block 302, for example, if the orientation change is not a big orientation change.

As indicated at block 308, the method may include disconnecting the wireless communication link, e.g., if the device has undergone a big orientation change. For example, controller 112 (FIG. 1) may disconnect wireless communication link 103 (FIG. 1) if the orientation change of device 102 is determined to be a big orientation change, e.g., as described above.

Referring back to FIG. 1, in some demonstrative embodiments, controller 112 may receive from movement sensors 134 placement-related information 115 including position-related information representing one or more position-related attributes of device 102, for example, a velocity of device 102.

In some demonstrative embodiments, controller 112 may determine a change in the one or more position-related attributes of device 102 during the predefined time period TI1, e.g., one second.

In some demonstrative embodiments, controller 112 may determine a first change, denoted ΔVx, during the predefined time period TI1, in a velocity of device 102 in the direction parallel to the X axis (FIG. 2), a second change, denoted ΔVy, during the predefined time period TI1, in a velocity of device 102 in the direction parallel to the Y axis (FIG. 2), and a third change, denoted ΔVy, during the predefined time period TI1, in a velocity of device 102 in the direction parallel to the Y axis (FIG. 2).

In some demonstrative embodiments, controller 112 may estimate a distance of a movement of device 102, denoted d, during the predefined time period TI1, based on the velocity changes ΔVx, ΔVy, ΔVz, e.g., as follows:

For example, controller 112 may utilize Equation 5 to estimate the distance between first point 219 (FIG. 2) and second point 217 (FIG. 2), e.g., when device 202 (FIG. 2) is moved from first point 219 (FIG. 2) to second point 217 (FIG. 2).

In some demonstrative embodiments, controller 112 may disconnect wireless communication link 103 based on a comparison between the estimated distance d and a predefined distance threshold.

In some demonstrative embodiments, controller 112 may disconnect wireless communication link 103, for example, if the estimated distance d exceeds the predefined distance threshold.

For example, the predefined distance threshold may be, for example, two meters. Controller 112 may disconnect wireless communication link 103, e.g., if controller 112 determines that the estimated distance d of movement of device 102 is greater than two meters, for example, if a user of device 102 moves device 102 more than two meters away from device 104.

In some demonstrative embodiments, controller 112 may disconnect wireless communication link 103 based on a combination of changes in the position-related attributes and the orientation-related attributes of device 102. For example, controller 112 may disconnect wireless communication link 103 if the estimated distance d is greater than a predefined distance threshold, e.g., one meter, and an orientation change is greater than a predefined orientation threshold, e.g., the change of the pitch Δpitch is greater than the predefined pitch threshold TH_P.

In some demonstrative embodiments, disconnecting wireless communication link 103 based on information 115 may reduce and/or eliminate the use of link-maintenance operations, which involve devices 104 and 102.

In some demonstrative embodiments, disconnecting wireless communication link 103 based on information 115 may reduce a power consumption of devices 104 and 102.

Figure 4:
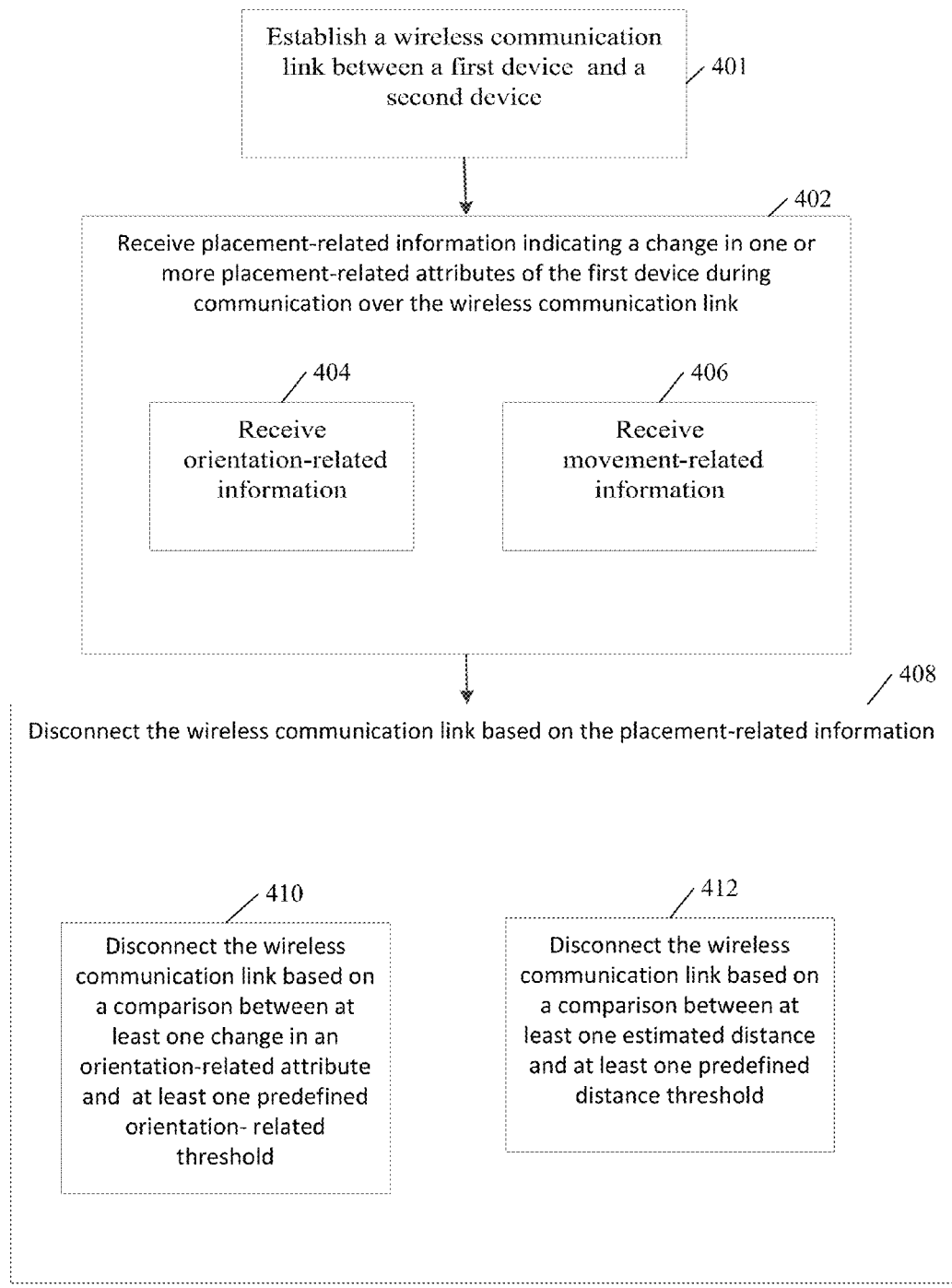
FIG. 4 is a schematic flow-chart illustration of a method of disconnecting a wireless communication link, in accordance with some demonstrative embodiments.

Reference is made to FIG. 4, which schematically illustrates a method of disconnecting a wireless communication link, in accordance with some demonstrative embodiments. In some embodiments, one or more of the operations of the method of FIG. 4 may be performed by a wireless communication system, e.g., system 100 (FIG. 1); a mobile device, e.g., devices 102 (FIG. 1 and/or 104 (FIG. 1); a controller, e.g., controller 112 (FIG. 1), and/or a wireless communication unit, e.g., wireless communication units 110 and/or 120 (FIG. 1).

As indicated at block 401, the method may include establishing a wireless communication link between a first device, e.g., a wireless mobile device, and a second device, e.g., a docking device. For example, wireless communication unit 110 (FIG. 1) may establish wireless communication link 103 with wireless communication unit 120 (FIG. 1), e.g., as described above.

As indicated at block 402, the method may include receiving placement-related information indicating a change in one or more placement-related attributes of the wireless communication device during communication over the wireless communication link. For example, controller 112 (FIG. 1) may receive from sensors 130 (FIG. 1) placement-related infor- $$d = \sqrt{\left(\int_{t}^{t+TI1}\int_{t}^{t+TI1}\Delta V_x(t)\,dt\,dt\right)^2 + \left(\int_{t}^{t+TI1}\int_{t}^{t+TI1}\Delta V_y(t)\,dt\,dt\right)^2 + \left(\int_{t}^{t+TI1}\int_{t}^{t+TI1}\Delta V_z(t)\,dt\,dt\right)^2}$$ (5)

wherein t denotes the beginning of time period TI1.

mation 115 (FIG. 1) indicating a change in one or more placement-related attributes of device 102 (FIG. 1) during communication over wireless communication link 103 (FIG. 1), e.g., as described above.

As indicated at block 404, receiving the placement-related information may include receiving orientation-related information. For example, controller 112 (FIG. 1) may receive from orientation sensors 132 (FIG. 1) orientation-related information corresponding to an orientation of device 102 (FIG. 1), e.g., as described above.

As indicated at block 406, receiving the placement-related information may include receiving position-related information. For example, controller 112 (FIG. 1) may receive from position sensors 134 (FIG. 1) position-related information corresponding to a position of device 102 (FIG. 1), e.g., as described above.

As indicated at block 408, the method may include selecting to disconnect the wireless communication link based on the placement-related information. For example, controller 112 (FIG. 1) may select whether or not to disconnect wireless communication link 103 based on placement-related information 115 (FIG. 1), e.g., as described above.

As indicated at block 410, disconnecting the wireless communication link may include disconnecting the wireless communication link based on a comparison between a change in at least one orientation-related attribute and at least one predefined orientation-related threshold. For example, controller 112 (FIG. 1) may select to disconnect wireless communication link 103 based on the comparison between a change in at least one orientation related attribute, e.g., pitch yaw and/or roll, of device 102 and the predefined orientation-related thresholds of the orientation related attributes, e.g., as described above.

As indicated at block 412, disconnecting the wireless communication link may include disconnecting the wireless communication link based on a comparison between at least one estimated distance and at least one predefined distance threshold. For example, controller 112 (FIG. 1) may select to disconnect wireless communication link 103 based on the comparison between the estimated distance d and the predefined distance threshold, e.g., as described above.

Figure 5:
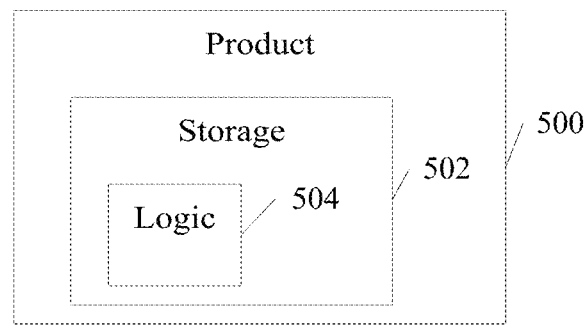
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of device 102 (FIG. 1), device 104 (FIG. 1), wireless communication unit 110 (FIG. 1), wireless communication unit 120 (FIG. 1), and/or controller 112 (FIG. 1) and/or to perform one or more operations of the methods of FIGS. 3 and/or 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a controller to receive from one or more sensors placement-related information indicating a change in one or more placement-related attributes of a wireless communication device, during communication over a wireless communication link, and based on said placement-related information to disconnect said wireless communication link, wherein said change in said one or more placement-related attributes comprises at least one change selected from the group consisting of a first change, during a predefined time period, in a velocity of said wireless communication device in a first direction, a second change, during said predefined time period, in a velocity of said wireless communication device in a second direction, perpendicular to said first direction, and a third change, during said predefined time period, in a velocity of said wireless communication device in a third direction, perpendicular to said first and second directions.

2. The apparatus of claim 1, wherein said one or more placement-related attributes comprise at least one attribute selected from the group consisting of a pitch of said wireless communication device, a yaw of said wireless communication device, and a roll of said wireless communication device.

3. The apparatus of claim 2, wherein said controller is to select to disconnect said wireless communication link based on at least one comparison selected from the group consisting of a first comparison between a change of the pitch, during a predefined time interval, and a predefined pitch threshold, a second comparison between a change of the yaw, during said predefined time interval, and a predefined yaw threshold, and a third comparison between a change of the roll, during said predefined time interval, to a predefined roll threshold.

4. The apparatus of claim 1, wherein said controller is to estimate a distance of a movement of said wireless communication device, during said predefined time period, based on said first, second and third changes, and to disconnect said wireless communication link based on a comparison between said estimated distance and a predefined distance threshold.

5. The apparatus of claim 1, wherein said placement-related information comprises information indicative of a change in at least one attribute selected from the group consisting of an orientation of said wireless communication device and a position of said wireless communication device.

6. The apparatus of claim 5, wherein said placement-related information comprises information indicative of a change in both an orientation of said wireless communication device and a position of said wireless communication device.

7. The apparatus of claim 1 comprising a mobile device.

8. The apparatus of claim 7, wherein said wireless communication link comprises a wireless communication link between said mobile device and a wireless docking device.

9. The apparatus of claim 7, wherein said mobile device comprises a device selected from the group consisting of a Smartphone, a Tablet computer, an Ultrabook computer, and a Notebook computer.

10. The apparatus of claim 1, wherein said wireless communication link comprises a beamformed link.

11. An apparatus comprising:
a controller to receive from one or more sensors placement-related information indicating a change in one or more placement-related attributes of a wireless communication device, during communication over a wireless communication link, said one or more placement-related attributes comprise at least one attribute selected from the group consisting of a pitch of said wireless communication device, a yaw of said wireless communication device, and a roll of said wireless communication device, and based on said placement-related information to select to disconnect said wireless communication link if at least one criterion is met, said at least one criterion is selected from the group consisting of:
a change of said pitch during a predefined time period is greater than a pitch threshold, and a change of said yaw during the predefined time period is greater than a yaw threshold;
a change of said roll during the predefined time period is greater than a roll threshold, and said change of said yaw is greater than said yaw threshold; and
said change of said roll is greater than said roll threshold and said change of said pitch is greater than said pitch threshold.

12. The apparatus of claim 11, wherein said wireless communication link comprises a beamformed link.

13. A system comprising:
a mobile device including:
one or more antennas;
a radio to communicate via said antennas over a wireless communication link;
one or more sensors to sense one or more placement-related attributes of said mobile device during communication over said wireless communication link; and
a controller to receive from said one or more sensors placement-related information indicating a change in said one or more placement-related attributes of said mobile device, and based on said placement-related information to disconnect said wireless communication link, wherein said change in said one or more placement-related attributes comprises at least one change selected from the group consisting of a first change, during a predefined time period, in a velocity of said wireless communication device in a first direction, a second change, during said predefined time period, in a velocity of said wireless communication device in a second direction, perpendicular to said first direction, and a third change, during said predefined time period, in a velocity of said wireless communication device in a third direction, perpendicular to said first and second directions.

14. The system of claim 13, wherein said one or more placement-related attributes comprise at least one attribute selected from the group consisting of a pitch of said mobile device, a yaw of said mobile device, and a roll of said mobile device.

15. The system of claim 14, wherein said controller is to select to disconnect said wireless communication link based on at least one comparison selected from the group consisting of a first comparison between a change of the pitch, during a predefined time interval, and a predefined pitch threshold, a second comparison between a change of the yaw, during said predefined time interval, and a predefined yaw threshold, and a third comparison between a change of the roll, during said predefined time interval, to a predefined roll threshold.

16. The system of claim 13, wherein said controller is to estimate a distance of a movement of said mobile device, during said predefined time period, based on said first, second and third changes, and to disconnect said wireless communication link based on a comparison between said estimated distance and a predefined distance threshold.

17. The system of claim 13, wherein said placement-related information comprises information indicative of a change in at least one attribute selected from the group consisting of an orientation of said mobile device and a position of said mobile device.

18. The system of claim 13, wherein said wireless communication link comprises a wireless communication link between said mobile device and a wireless docking device.

19. A system comprising:
a mobile device including:
one or more antennas;
a radio to communicate via said antennas over a wireless communication link;
one or more sensors to sense one or more placement-related attributes of said mobile device during communication over said wireless communication link; and
a controller to receive from said one or more sensors placement-related information indicating a change in said one or more placement-related attributes of said mobile device, during communication over said wireless communication link, said one or more placement-related attributes comprise at least one attribute selected from the group consisting of a pitch of said wireless communication device, a yaw of said wireless communication device, and a roll of said wireless communication device, and based on said placement-related information to select to disconnect said wireless communication link if at least one criterion is met, said at least one criterion is selected from the group consisting of:
- a change of said pitch during a predefined time period is greater than a pitch threshold, and a change of said yaw during the predefined time period is greater than a yaw threshold;
- a change of said roll during the predefined time period is greater than a roll threshold, and said change of said yaw is greater than said yaw threshold; and
- said change of said roll is greater than said roll threshold, and said change of said pitch is greater than said pitch threshold.

20. The system of claim 19, wherein said wireless communication link comprises a beamformed link.

21. A method comprising:
receiving from one or more sensors placement-related information indicating a change in one or more placement-related attributes of a wireless communication device during communication over a wireless communication link, wherein said change in said one or more placement-related attributes comprises at least one change selected from the group consisting of a first change, during a predefined time period, in a velocity of said wireless communication device in a first direction, a second change, during said predefined time period, in a velocity of said wireless communication device in a second direction, perpendicular to said first direction, and a third change, during said predefined time period, in a velocity of said wireless communication device in a third direction, perpendicular to said first and second directions; and
based on said placement-related information disconnecting said wireless communication link.

22. The method of claim 21, wherein said one or more placement-related attributes comprise at least one attribute selected from the group consisting of a pitch of said wireless communication device, a yaw of said wireless communication device, and a roll of said wireless communication device.

23. The method of claim 22 comprising disconnecting said wireless communication link based on at least one comparison selected from the group consisting of a first comparison between a change of the pitch, during a predefined time interval, and a predefined pitch threshold, a second comparison between a change of the yaw, during said predefined time interval, and a predefined yaw threshold, and a third comparison between a change of the roll, during said predefined time interval, to a predefined roll threshold.

24. A method comprising:
receiving from one or more sensors placement-related information indicating a change in one or more placement-related attributes of a wireless communication device, during communication over a wireless communication link, said one or more placement-related attributes comprise at least one attribute selected from the group consisting of a pitch of said wireless communication device, a yaw of said wireless communication device, and a roll of said wireless communication device; and
based on said placement-related information, disconnecting said wireless communication link if at least one criterion is met, said at least one criterion is selected from the group consisting of:
- a change of said pitch is greater than a pitch threshold during a predefined time period, and a change of said yaw during the predefined time period is greater than a yaw threshold;
- a change of said roll during the predefined time period is greater than a roll threshold, and said change of said yaw is greater than said yaw threshold; and
- said change of said roll is greater than said roll threshold, and said change of said pitch is greater than said pitch threshold.

25. The method of claim 24, wherein said wireless communication link comprises a beamformed link.

26. The method of claim 23 comprising estimating a distance of a movement of said wireless communication device, during said predefined time period, based on said first, second and third changes, and disconnecting said wireless communication link based on a comparison between said estimated distance and a predefined distance threshold.

27. A product including a non-transitory storage medium having stored thereon instructions that, when executed by a machine, result in:
receiving from one or more sensors placement-related information indicating a change in one or more placement-related attributes of a wireless communication device during communication over a wireless communication link, wherein said change in said one or more placement-related attributes comprises at least one change selected from the group consisting of a first change, during a predefined time period, in a velocity of said wireless communication device in a first direction, a second change, during said predefined time period, in a velocity of said wireless communication device in a second direction, perpendicular to said first direction, and a third change, during said predefined time period, in a velocity of said wireless communication device in a third direction, perpendicular to said first and second directions; and
based on said placement-related information disconnecting said wireless communication link.

28. The product of claim 27, wherein said one or more placement-related attributes comprise at least one attribute selected from the group consisting of a pitch of said wireless communication device, a yaw of said wireless communication device, and a roll of said wireless communication device.

29. The product of claim 28 comprising disconnecting said wireless communication link based on at least one comparison selected from the group consisting of a first comparison between change of the pitch, during a predefined time period, and a predefined pitch threshold, a second comparison between a change of the yaw, during said predefined time period, and a predefined yaw threshold, and a third comparison between a change of the roll, during said predefined time period, to a predefined roll threshold.

30. The product of claim 27 comprising estimating a distance of a movement of said wireless communication device, during said predefined time period, based on said first, second and third changes, and disconnecting said wireless communication link based on a comparison between said estimated distance and a predefined distance threshold.

* * * * *